US012679173B2

(12) United States Patent
Olfe et al.

(10) Patent No.: US 12,679,173 B2
(45) Date of Patent: Jul. 14, 2026

(54) ELASTOCALORIC HEAT PUMP AND TRANSPORTATION VEHICLE WITH ELASTOCALORIC HEAT PUMP

(71) Applicant: VOLKSWAGEN AKTIENGESELLSCHAFT, Wolfsburg (DE)

(72) Inventors: Jürgen Olfe, Volkse (DE); Christian Schneck, Braunschweig (DE); Sergej Kujat, Varrel (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 157 days.

(21) Appl. No.: 18/479,466

(22) Filed: Oct. 2, 2023

(65) Prior Publication Data
US 2024/0109399 A1 Apr. 4, 2024

(30) Foreign Application Priority Data
Sep. 30, 2022 (DE) .................... 10 2022 210 435.8

(51) Int. Cl.
*B60H 1/32* (2006.01)
*B60H 1/14* (2006.01)
*F25B 23/00* (2006.01)

(52) U.S. Cl.
CPC ................ *B60H 1/32* (2013.01); *B60H 1/14* (2013.01); *F25B 23/00* (2013.01)

(58) Field of Classification Search
CPC ... B60H 1/32; B60H 1/14; F25B 23/00; F25B 30/00
See application file for complete search history.

(56) References Cited

U.S. PATENT DOCUMENTS

| | | | | |
|---|---|---|---|---|
| 6,173,689 B1* | 1/2001 | Tanaka | ...................... | F01L 1/02 |
| | | | | 123/90.34 |
| 10,018,385 B2* | 7/2018 | Radermacher | ........... | C09K 5/10 |
| 10,823,465 B2* | 11/2020 | Radermacher | ......... | F03G 7/062 |
| 11,274,860 B2* | 3/2022 | Schroeder | ............... | F25B 23/00 |
| 11,454,429 B2* | 9/2022 | Bartholome | .......... | F03G 7/0614 |
| 12,270,610 B2* | 4/2025 | Rohskopf | ............... | F28D 17/04 |
| 2012/0273158 A1* | 11/2012 | Cui | ...................... | F03G 7/0614 |
| | | | | 165/10 |
| 2016/0084544 A1* | 3/2016 | Radermacher | ........... | C09K 5/14 |
| | | | | 62/304 |

(Continued)

FOREIGN PATENT DOCUMENTS

| | | | | | |
|---|---|---|---|---|---|
| BE | 1022756 A1 * | 8/2016 | ............. | D03D 49/60 |
| CN | 115339364 A | 11/2022 | | |

(Continued)

*Primary Examiner* — Ljiljana V. Ciric
(74) *Attorney, Agent, or Firm* — BARNES & THORNBURG LLP

(57) ABSTRACT

An elastocaloric heat pump requiring little installation space wherein the elastocaloric heat pump includes an elastocaloric element, a first coolant duct and a second coolant duct and at least one drive device, wherein the elastocaloric element is connected to a carriage on the end sides in each case, the carriages are arranged displaceably on two guide mechanisms which are not parallel to each other, and the drive device cyclically displaces the carriages along the guide mechanism so the elastocaloric element is displaced cyclically and cyclically expanded between the first coolant duct and the second coolant duct.

7 Claims, 8 Drawing Sheets

(56) References Cited

U.S. PATENT DOCUMENTS

| 2020/0217567 A1* | 7/2020 | Schroeder | F25B 23/00 |
| 2021/0071919 A1 | 3/2021 | Wuest et al. | |
| 2024/0109399 A1* | 4/2024 | Olfe | B60H 1/14 |

FOREIGN PATENT DOCUMENTS

| CN | 115339364 B | * | 8/2023 | B60N 2/56 |
| CN | 119032246 A | * | 11/2024 | F25B 21/00 |
| DE | 102019203889 A1 | * | 9/2020 | F24V 99/00 |
| DE | 102020113771 A1 | | 11/2021 | |
| DE | 102021209740 A1 | * | 3/2023 | F25B 23/00 |
| DE | 102022203621 A1 | * | 10/2023 | F25B 23/00 |
| DE | 102022203994 A1 | * | 10/2023 | F25B 23/00 |
| DE | 102022209814 A1 | * | 3/2024 | F25B 23/00 |
| DE | 102023207865 A1 | * | 2/2025 | F25B 23/00 |
| DE | 102023210449 B4 | * | 8/2025 | F25B 23/00 |
| DE | 102022205876 B4 | * | 10/2025 | F25B 23/00 |
| EP | 4269907 A1 | * | 11/2023 | F25B 23/00 |
| EP | 4481301 A1 | * | 12/2024 | F03G 7/06114 |
| WO | WO-2020234235 A1 | * | 11/2020 | F03G 7/0614 |
| WO | 2021023687 A1 | | 2/2021 | |
| WO | WO-2024039720 A1 | * | 2/2024 | F03G 7/06112 |

* cited by examiner

ELASTOCALORIC HEAT PUMP AND TRANSPORTATION VEHICLE WITH ELASTOCALORIC HEAT PUMP

PRIORITY CLAIM

This patent application claims priority to German Patent Application No. 10 2022 210 435.8, filed 30 Sep. 2022, the disclosure of which is incorporated herein by reference in its entirety.

SUMMARY

Illustrative embodiments relate to an elastocaloric heat pump, comprising an elastocaloric element, a first coolant duct and a second coolant duct and at least one drive device. Illustrative embodiments further relate to a transportation vehicle having an elastocaloric heat pump.

BRIEF DESCRIPTION OF THE DRAWINGS

Disclosed embodiments are explained in more detail below with reference to the attached drawings, in which.

DETAILED DESCRIPTION

Figure 1A:
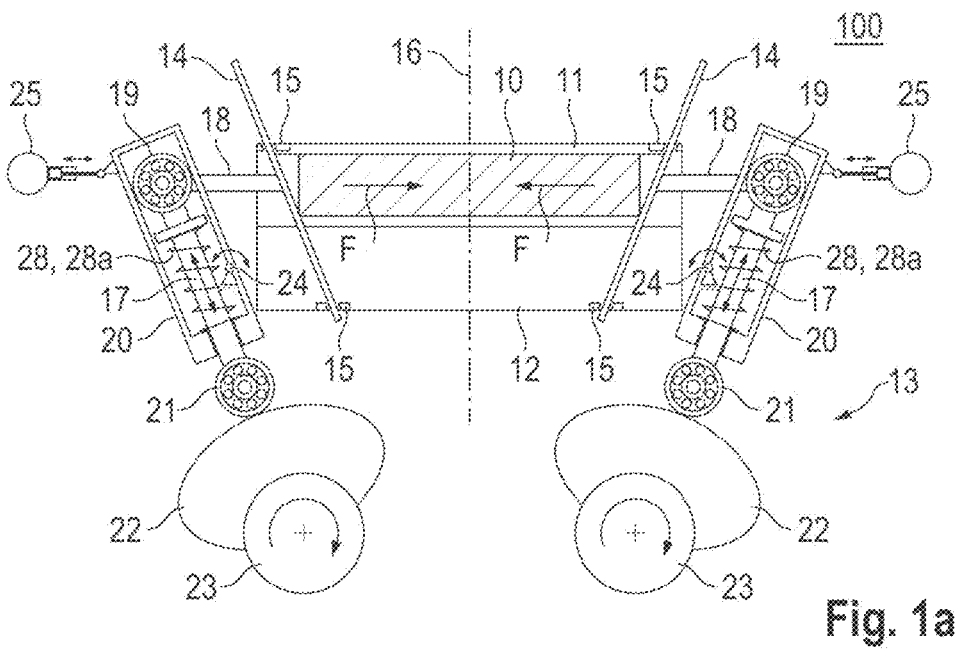
FIG. 1a shows a first view of a first exemplary embodiment of an elastocaloric heat pump with camshafts.

Elastocaloric heat pumps can be used to increase the efficiency of heat pumps in transportation vehicles. The elastocaloric effect is used in an elastocaloric heat pump, with cyclic deformation of an elastocaloric material causing a reversible temperature change, which can be used to transfer heat from a colder coolant flow to a warmer coolant flow. However, such elastocaloric heat pumps require a very large installation space. In addition, efficient guiding of the coolant is difficult.

WO 2021/023687 discloses a heat pump system having a first core consisting of an elastocaloric material made from a shape memory alloy or having negative thermal expansion, which is arranged in a housing and designed to change its state in response to a temperature change caused by a fluid, and having a second core consisting of an elastocaloric material made from a shape memory alloy or having negative thermal expansion, which is located in the housing and can change its state in response to a temperature change supplied by the fluid. Furthermore, a pump mechanism is provided which is fluidically connected to the first core and the second core and controls the supply of fluid to the first and second cores.

US 2021/0071919 discloses a heat exchanger system includes a heat exchanger device which has elastocaloric elements made of elastocaloric material and is designed to move the elastocaloric elements, as a result of which the latter are deformed such that an elastocaloric effect is achieved.

The disclosed embodiments provide an elastocaloric heat pump which requires little installation space.

To achieve this, an elastocaloric heat pump, comprising an elastocaloric element, a first coolant duct and a second coolant duct and at least one drive device, is proposed, wherein provision is made that the elastocaloric element is in each case connected to a carriage on the end sides, the carriages being arranged displaceably on two guide mechanisms which are not arranged parallel to each other, and the drive device being designed to cyclically displace the carriages along the guide mechanism such that the elastocaloric element is displaced cyclically and cyclically expanded between the first coolant duct and the second coolant duct.

Expansion can be understood as meaning stretching, i.e., a positive change in length, and/or a compression, i.e., a negative change in length.

The elastocaloric heat pump can also comprise a plurality of elastocaloric elements. The guide mechanisms are not arranged parallel to each another. This may mean that the two guide mechanisms are arranged in a V-like manner relative to each other. The elastocaloric heat pump can be designed substantially symmetrically with respect to an imaginary central axis of the V-like arrangement of the guide mechanism.

With regard to the imaginary central axis of the V-like arrangement of the guide mechanism, the term "bottom" refers below to the region in the direction of the tip of the V-like arrangement. The term "top" refers to the region in the direction of the opening of the V-like arrangement. The terms "right" and "left" should be interpreted accordingly.

The elastocaloric element may be displaced cyclically upward and downward during the cyclical displacement of the carriages along the guide mechanism by the drive device, that is to say along the central axis of the V-like arrangement of the two guide mechanisms which are not arranged parallel to each another. The two coolant ducts are arranged one above the other with respect to the central axis, i.e., the first coolant duct is arranged in the upper region of the V-like arrangement consisting of the two guide mechanisms which are not arranged parallel to each another, and the second coolant duct is arranged in the lower region of the V-like arrangement consisting of the two guide mechanisms which are not arranged parallel to each another.

The coolant ducts may be sealed in relation to each another and in relation to an external environment.

The guide mechanism can be designed, for example, as rails or linear guides in which the carriages are held displaceably. In particular, the guide mechanism can be arranged in walls of the coolant ducts.

The carriages can be of such large dimensions that they simultaneously also seal the coolant ducts to the outside.

If the elastocaloric element is displaced along the guide mechanisms, which are not arranged parallel, via the carriages, which are arranged displaceably on the guide mechanism, along the central axis of the imaginary V-like arrangement of the guide mechanism, the elastocaloric element is stretched when it is displaced upward in the direction of the opening of the V and is compressed when it is displaced downward in the direction of the tip of the V.

The axis along which the elastocaloric element is expanded, i.e., stretched or compressed, therefore does not run parallel, but optionally perpendicular, to the direction of displacement of the elastocaloric element along the central axis of the V-like arrangement of the two guide mechanisms. This separation of displacement direction and expansion axis means that the elastocaloric heat pump can be designed to be more compact overall. In addition, this reduces shocks or vibrations.

Provision is made that the drive device comprises drive rods, in particular, connecting rods or plungers, the carriages each being rotatably or rigidly connected to one of the drive rods, and the drive rods each being guided along a track.

The tracks can be designed as parts separate from the guide mechanism. However, it is also possible that the guide mechanisms are simultaneously designed as tracks and are therefore additionally also designed to guide the drive rods. In the latter case, the carriages can be arranged displaceably on the guide mechanism, which are also tracks for the drive rods, via the connection to the drive rods.

Thus, in each case one of the drive rods is connected to each of the carriages arranged on the end sides of the elastocaloric element. The drive rods serve to displace the carriages and thus also the elastocaloric element along the guide mechanism and in this way to expand and cyclically displace the elastocaloric element between the first coolant duct and the second coolant duct. Each of the drive rods may be assigned to one of the carriages and one of the guide mechanism.

The drive rods are arranged approximately parallel to the respectively assigned guide mechanisms. The term approximately parallel in this case means that the drive rods enclose an angle of less than 45°, optionally less than 30°, more optionally less than 15°, with the guide mechanism.

The drive rods can be designed in a manner explained further below to transmit a cam stroke of a camshaft or a crank stroke of a crankshaft to the carriages and in this way to move the carriages along the guide mechanism.

The carriages can be connected directly to the drive rods. In addition, however, it is also possible for connecting elements, in particular, rods, to be provided between the carriages and the drive rods. The connecting elements, in particular, the rods, can be connected rotatably or rigidly to the carriage and/or can be connected rotatably or rigidly to the drive rods.

Provision is made that the tracks are arranged non-orthogonally, optionally substantially parallel, to the guide mechanism.

Owing to the non-orthogonal, substantially parallel, arrangement of the tracks to the guide mechanism, the drive rods guided on the tracks can be displaced substantially parallel along the guide mechanism. In this way, the carriages of the elastocaloric element, which are connected to the drive rods, are also displaced along the guide mechanism such that the elastocaloric element is expanded, i.e., compressed or stretched.

The tracks may be arranged substantially parallel to the guide mechanism. Substantially parallel here means that an angle of less than 45°, optionally less than 30°, even more optionally less than 15°, is enclosed between the tracks and the respectively assigned guide mechanism. The tracks can also run exactly parallel to the guide mechanism.

In particular, provision can be made that the tracks are mounted rotatably such that an angle between the respective track and the respective guide mechanism is adjustable.

Depending on the adjusted angle, a different translation of the displacement of the drive rods along the tracks to the displacement of the carriages together with the elastocaloric element along the guide mechanism is brought about. The heat transfer caused by the elastocaloric effect can thus be adjusted by adjusting the angle between the respective track and the respective guide mechanism. The angle between the respective track and the respective guide mechanism can be adjusted by swivel joints and servomotors.

Alternatively or additionally, the guide mechanism can also be mounted rotatably.

The angle between the respective track and the respective guide mechanism may be adjustable between 0° and 45°, optionally between 0° and 30°, more optionally between 0° and 15°, particularly optionally between 0° and 5°.

Furthermore, provision can be made that the tracks are roller tracks, and that the drive rods are guided on the respective roller track by rollers.

The roller can also be a roller bearing.

The roller can be arranged at the connection between carriage and drive rod, in particular, at the connection between the connecting element, more particularly, the rod, and the drive rod. By guiding the drive rods along the roller track by rollers, the transmission of force from the drive device to the carriages of the elastocaloric element can be further improved, and, in particular, shocks and vibrations can be reduced.

Provision may be made that the tracks each have a linear guide, and therefore the drive rods are each limited to a linear movement.

By designing the roller track with a linear guide, shocks and vibrations during operation of the elastocaloric heat pump are further reduced.

Furthermore, provision can be made that in each case a receiving method or mechanism, in particular, in each case a clamping jaw, is arranged on the end sides of the elastocaloric element, the receiving method or mechanism being connected rotatably or rigidly to one carriage each.

With further benefit, provision can be made that the elastocaloric element is preloaded in tension or in compression between the receiving method or mechanism.

By preloading the elastocaloric element in compression or in tension, the forces which have to be applied to exploit the elastocaloric effect can be reduced. In particular, by virtue of the preloading, the elastocaloric element can already be preloaded in the expansion region in which the elastocaloric effect occurs most strongly.

With further benefit, provision is made that spring elements, optionally helical springs and/or gas pressure springs, are provided to at least partially compensate for a force exerted on the carriages along the guide mechanism because of the preloading of the elastocaloric element.

If the elastocaloric element is preloaded in tension or in compression, the restoring force acting along the expansion axis has a component along the guide mechanism because of the non-parallel arrangement of the guide mechanism. For example, if the elastocaloric element is preloaded in tension, this force component is directed along the guide mechanism in the direction of the tip of the imaginary V. If the elastocaloric element is preloaded in compression, this force component is directed in the direction of the opening of the imaginary V. By the arrangement of a spring element, such as a helical spring or gas pressure spring, this force caused by the preloading can be at least partially compensated for. This permits a more efficient and vibration-free operation of the elastocaloric heat pump.

The spring elements can also be tension spring elements or compression spring elements.

Provision can be made that the spring elements are arranged in a force-effective manner between the drive rods and the respective track, in particular, the linear guide.

With further benefit, provision can be made that the drive device comprises at least one camshaft, optionally two camshafts, each of the camshafts comprising a cam.

The camshaft or the two camshafts is or are designed to move the drive rods such that the drive rods transmit their movement to the carriages of the elastocaloric element and thereby displace the elastocaloric element along the guide mechanism.

Provision may be made that a camshaft with at least one cam is provided for each of the drive rods.

Provision can be made that the drive rods run on the cam of in each case one of the camshafts by one roller each.

The roller, which is designed to run on the cam of the camshaft, is particularly provided on that side of the drive rod which is opposite the connection between the drive rod and the carriage.

The cam contour may be designed such that the elastocaloric element remains in the first coolant duct and the second coolant duct for a particularly long time, and that the transition between the first coolant duct and the second coolant duct takes place in a relatively short period of time. For this purpose, the cam contour can be designed such that the respective drive rod is driven according to a square wave signal.

If the drive device comprises at least one camshaft, it is particularly beneficial if spring elements, optionally helical springs and/or gas pressure springs, are provided. By using of the spring elements, the drive rod comprising the roller of the drive rod, which is designed to run on the cam of the camshaft, can be pressed or pulled onto the cam of the camshaft to ensure constant contact of the roller with the cam. Depending on the spatial arrangement of the spring elements, drive rods and tracks, the spring elements can be tension spring elements or compression spring elements.

Provision can be made that the drive device comprises at least one crankshaft, optionally two crankshafts, each of the crankshafts comprising a crank mechanism.

Even with one crankshaft, the drive rods can be moved along the track, optionally along the roller track. Provision may be made that a crankshaft is provided for each of the drive rods.

Provision may be made that the drive rods are each mounted rotatably on the crank mechanism of in each case one of the crankshafts.

The rotatable arrangement of the drive rods on the crank mechanism causes the crank stroke to be transferred to the drive rods, in particular, to the connecting rods. If the track, in particular, the roller track, has a linear guide, provision can be made that a further interconnecting connecting rod is provided between the drive rod and the crank mechanism to compensate for a lateral deflection of the drive rod due to the rotation of the crank mechanism.

With further benefit, the camshaft or the camshafts of the drive device can be arranged in the lower region or below the V-like arrangement of the two guide mechanisms which are not arranged parallel to each other, i.e., in the region of the tip of the V-like arrangement of the guide mechanism. It is also possible for the camshaft or the camshafts of the drive device to be arranged in the upper region or above the V-like arrangement of the two guide mechanisms which are not arranged parallel to each another, i.e., in the region of the opening of the V-like arrangement of the guide mechanism.

Accordingly, the crankshaft or the crankshafts can also be arranged below or above the V-like arrangement of the two guide mechanism which are not arranged parallel to each another.

An arrangement of the camshaft or the camshafts below the V-like arrangement of the guide mechanism is particularly beneficial when the elastocaloric element is preloaded in tension, so that the force component of the restoring force acting along the guide mechanism is directed toward the tip of the V-like arrangement. The force component then causes the drive rods, in particular, the rollers of the drive rods provided for running on the cams of the camshafts, to be pressed in the direction of the camshaft or camshafts.

Conversely, an arrangement of the camshaft or the camshafts above the V-like arrangement of the guide mechanism is beneficial whenever the elastocaloric element is preloaded in compression, so that the force component of the restoring force acting along the guide mechanism is directed toward the opening of the V-like arrangement. The force component then also causes the drive rods, in particular, the rollers of the drive rods provided for running on the cams of the camshafts, to be pressed in the direction of the camshaft or camshafts.

With further benefit, a force transmission element, in particular, a rod or a plate, can be provided, the force transmission element being arranged between the camshaft or the crankshaft and the drive rods, the force transmission element being designed for transmitting force from the camshaft or the crankshaft to the drive rods.

In this case, only one camshaft or only one crankshaft is provided.

The force transmission element, in particular, the rod or plate, is arranged in such a way that it is moved upward and downward by the camshaft or crankshaft with respect to the central axis of the V-like arrangement of the guide mechanism. The drive rods are in turn driven by the force transmission element such that the cam stroke or crank stroke is transmitted via the force transmission element to the drive rods and thus to the carriages of the elastocaloric element.

Provision may be made that the force transmission element runs by a roller on the cam of a camshaft, or that the force transmission element is connected via an intermediate connecting rod to the crank mechanism of a crankshaft.

Furthermore, provision can be made that the drive rods each run on the force transmission element by means of a roller, or that the drive rods are connected to ends of the force transmission element by a joint.

If the drive rods run on the force transmission element by a roller, the force transmission element can be designed relatively simply as a plate or rod without any further technical measures. If, on the other hand, provision is made that the drive rods are connected to the ends of the force transmission element via a swivel joint, then to ensure the displacement of the drive rods without tension, the force transmission element has to be designed to be variable in length, in particular, with respect to an axis perpendicular to the central axis of the V-like arrangement.

The disclosed embodiments also provide for a transportation vehicle comprising an elastocaloric heat pump as previously described.

In the figures, identical or mutually corresponding parts are identified with the same reference signs.

Figure 1B:
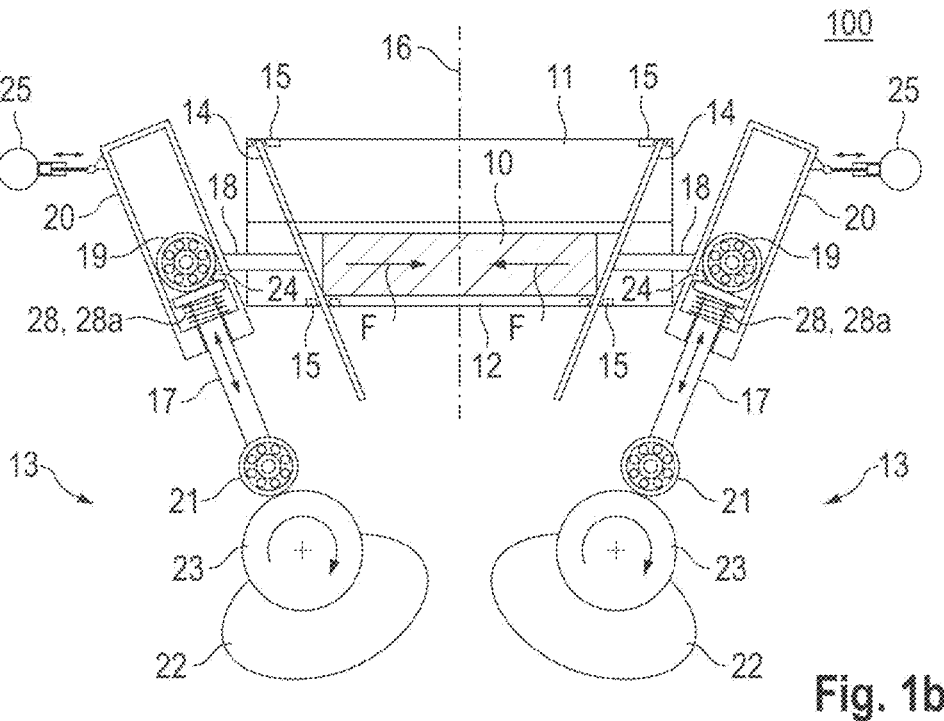
FIG. 1b shows a second view of the first exemplary embodiment of an elastocaloric heat pump with camshafts.

FIGS. 1a and 1b show an elastocaloric heat pump 100 comprising an elastocaloric element 10, a first coolant duct 11, a second coolant duct 12 and a drive device 13. The elastocaloric element 10 is connected in each case to a carriage 14 on the end sides, and each of the carriages 14 is in turn arranged displaceably on one of two guide mechanisms 15 which are not arranged parallel to each another. The drive device 13 is designed to cyclically displace the carriages 14 along the guide mechanism 15 such that the elastocaloric element 10 is displaced cyclically between the first coolant duct 11 and the second coolant duct 12 along a central axis 16 of the elastocaloric heat pump 100 and is cyclically expanded, i.e., stretched or compressed, perpendicularly to the central axis 16.

The guide mechanism 15, which are not arranged parallel to each another, are arranged in an approximately V-like manner with respect to each other. The elastocaloric heat pump 100 is therefore designed to be substantially minor-symmetrical to the central axis 16. With respect to the central axis 16, the first coolant duct 11 and the second coolant duct 12 are arranged one above the other, and the elastocaloric element 10 is displaced by the displacement of the carriages 14 along the guide mechanism 15 between the first coolant duct 11 and the second coolant duct 12. At the same time, the elastocaloric element is cyclically expanded, that is, compressed or stretched, because of the guide mechanism 15 which are not arranged parallel to each other. For the displacement of the carriages 14 along the guide mechanism 15, the drive device 13 has drive rods 17, which are connected rotatably to the carriages 14 via rods 18. The drive rods 17 each have rollers 19 at the connection to the rods 18, by which rollers the drive rods 17 run on roller tracks 20 with a linear guide. The drive rods 17 each have further rollers 21 at the end opposite the connection to the rods 18, which rollers roll on the cams 22 of in each case an assigned camshaft 23. By rotating the camshafts 23, the cam stroke is therefore transmitted to the drive rods 17 and to the carriages 14, as a comparison of FIGS. 1a and 1b shows, such that the carriages 14 are cyclically displaced along the guide mechanism 15. The roller tracks 20 are mounted rotatably on swivel joints 24. By use of servomotors 25, the angle between the roller tracks 20 and the respectively associated guide mechanism 15 can be adjusted, as a result of which the cam stroke can be translated differently into the displacement of the carriages 14 along the guide mechanism 15 depending on the angle.

Figure 2:
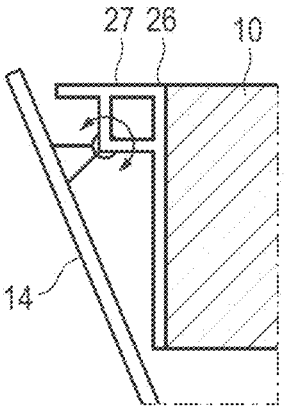
FIG. 2 shows a detailed view of a receiving mechanism for an elastocaloric element.

According to the detailed view of FIG. 2, the elastocaloric element 10 is in each case clamped on the end sides between receiving method or mechanism 27 which are designed as clamping jaws 26 and which in turn are connected rotatably to the respective carriage 14. The elastocaloric element 10 can be preloaded either in tension or in compression between the clamping jaws 26. Owing to the preloading of the elastocaloric element 10, a component of the restoring force counteracting the preloading also acts parallel to the guide mechanism 15. The restoring force tends to press the drive rods 17 with the rollers 21 onto the respective cams 22 of the associated camshaft 23. Since the restoring force may be too low to ensure secure contact of the rollers 21 with the cams, spring elements 28 can be provided in the roller tracks 20, which spring elements are arranged in a force-effective manner between the drive rods 17 and the respective roller track 20. The spring elements 28 are designed as tension spring elements 28a and pull the drive rods 17 with the rollers 21 toward the respective cams 22.

Figure 3:
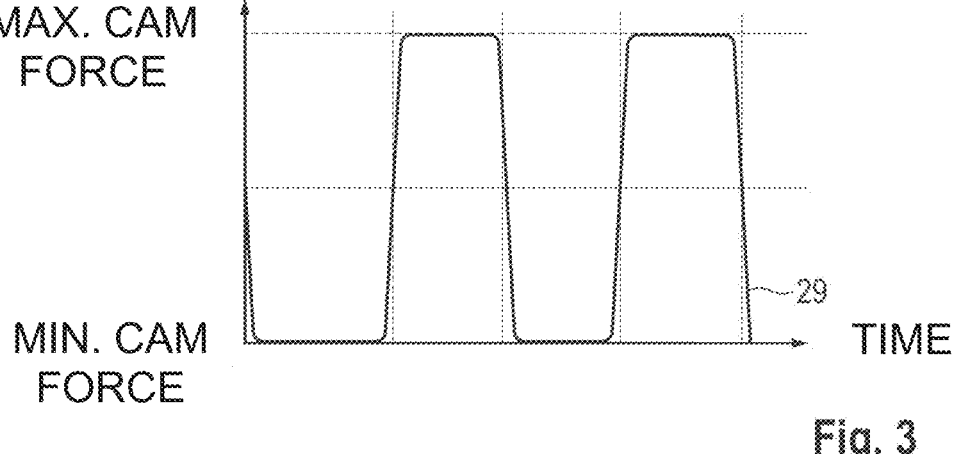
FIG. 3 shows a diagram of a cam stroke.

The cam contours of the cams 22 are designed such that they substantially correspond to a square wave signal 29, as shown in FIG. 3. This choice of the cam contours means that the elastocaloric element 10 remains in the first coolant duct 11 or in the second coolant duct 12 for as long as possible with a constant stroke, and that the transition between the first coolant duct 11 and the second coolant duct 12 takes place comparatively quickly.

Figure 4A:
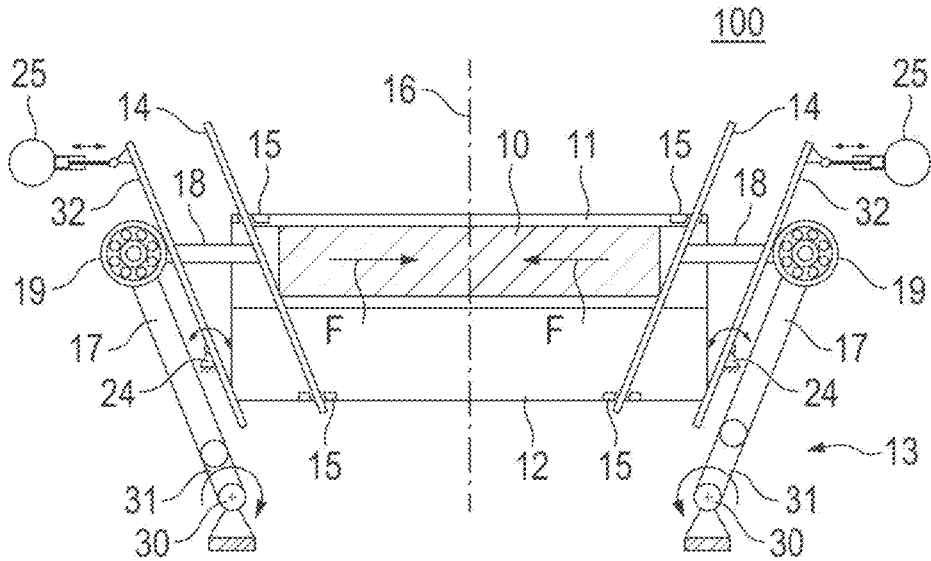
FIG. 4a shows a first view of a second exemplary embodiment of an elastocaloric heat pump with crankshafts.
Figure 4B:
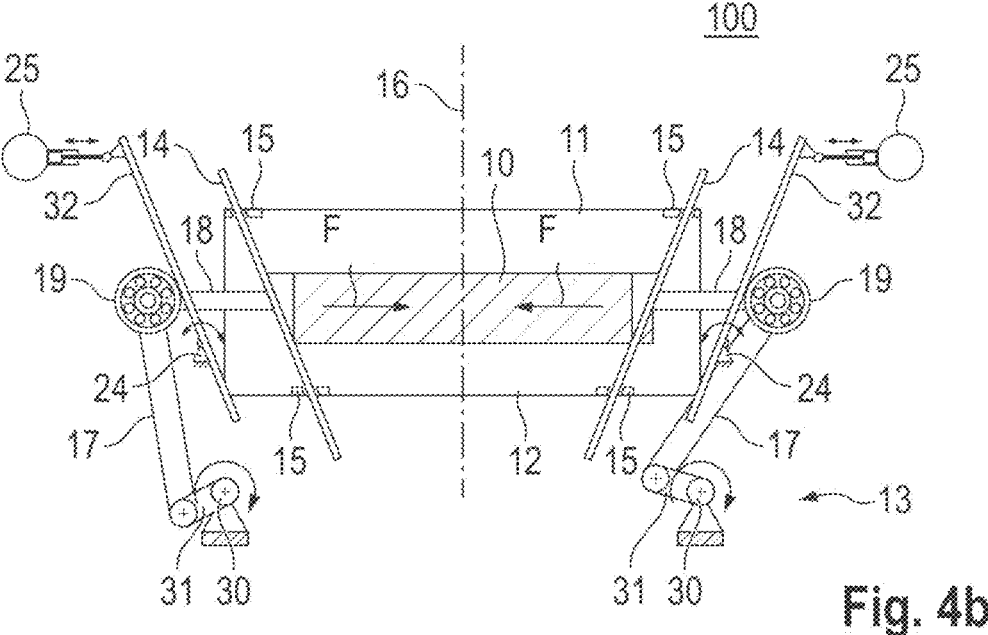
FIG. 4b shows a second view of the second exemplary embodiment of an elastocaloric heat pump with crankshafts.

FIGS. 4a and 4b show a further exemplary embodiment of the elastocaloric heat pump 100. In the disclosed embodiment shown in FIGS. 4a and 4b, the drive device 13 comprises two crankshafts 30, each with a crank mechanism 31. One of the drive rods 17 is mounted rotatably on each of the crank mechanisms 31. By rotating the crankshafts 30, the drive rods 17 are displaced approximately parallel along roller tracks 32 without a linear guide parallel to the guide mechanism, as a result of which the elastocaloric element 10 is also displaced and cyclically expanded between the first coolant duct 11 and the second coolant duct 12.

Figure 5A:
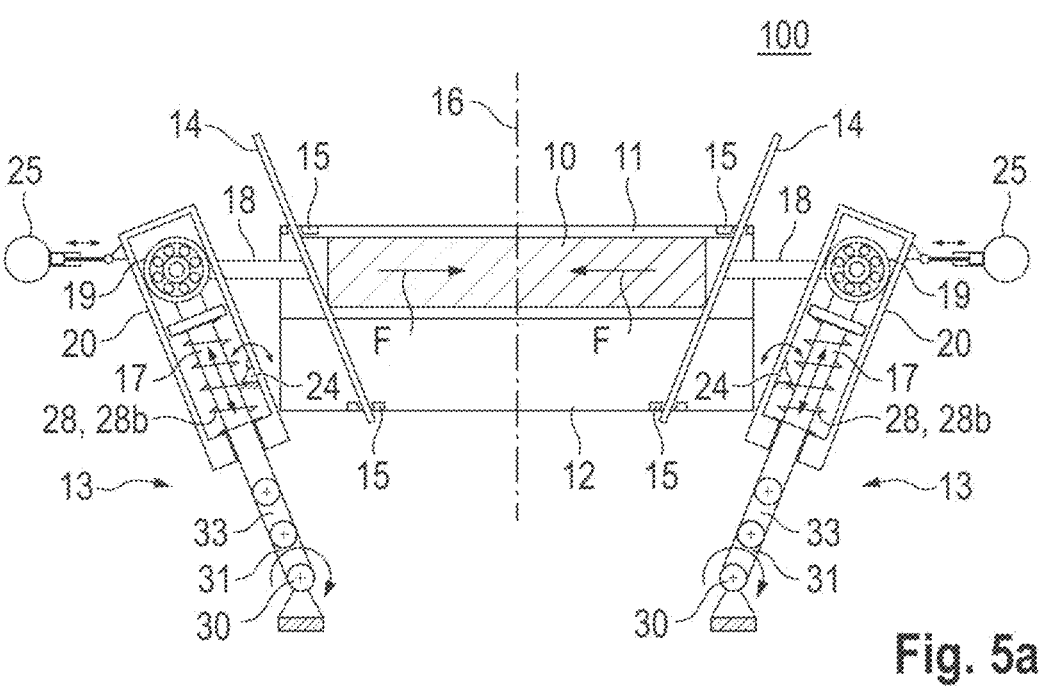
FIG. 5a shows a first view of a third exemplary embodiment of an elastocaloric heat pump with crankshafts.
Figure 5B:
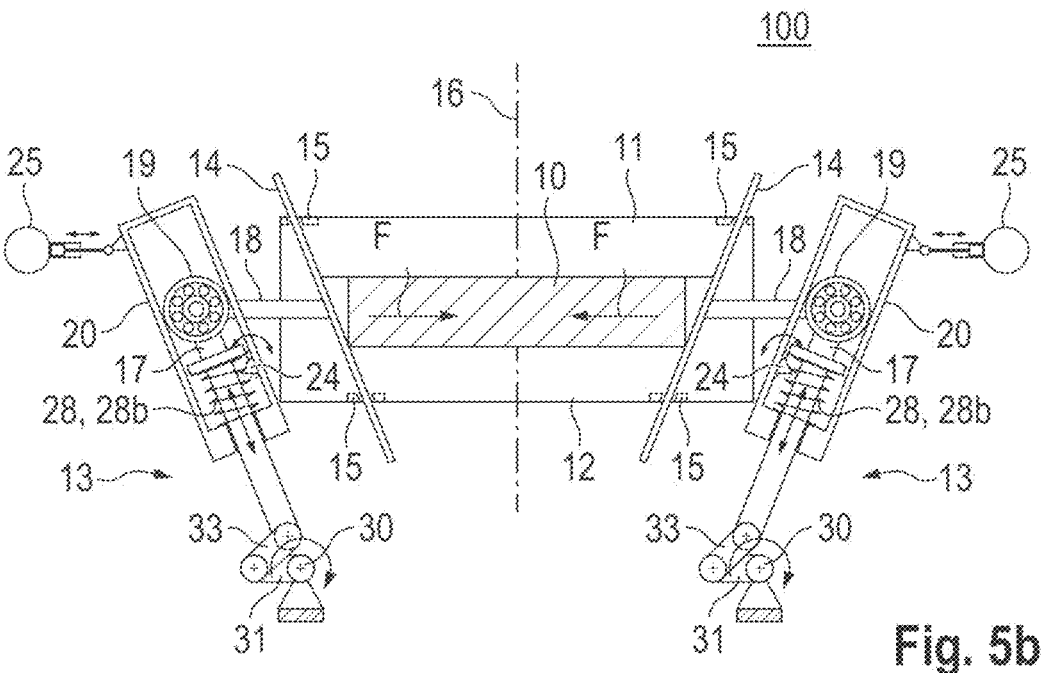
FIG. 5b shows a second view of the third exemplary embodiment of an elastocaloric heat pump with crankshafts.

FIGS. 5a and 5b show a disclosed embodiment of the heat pump 100 according to FIGS. 4a and 4b. As compared to the heat pump 100 according to FIGS. 4a and 4b, the roller tracks 20 are designed with a linear guide. To compensate for the lateral movement of the crank mechanisms 31, interconnected connecting rods 33 are provided between the crank mechanisms 31 and the drive rods 17 in this case. Spring elements 28 are also provided in the disclosed embodiment according to FIGS. 5a and 5b. In principle, the spring elements 28 can be designed as tension spring elements 28a. However, if the restoring forces caused by the preloading of the elastocaloric element 10 and directed parallel to the guide mechanism 15 are of a size sufficient to overcome the frictional forces, the spring elements 28 can also be designed as compression springs 28b to compensate for the component of the restoring force produced by the preloading.

Figure 6A:
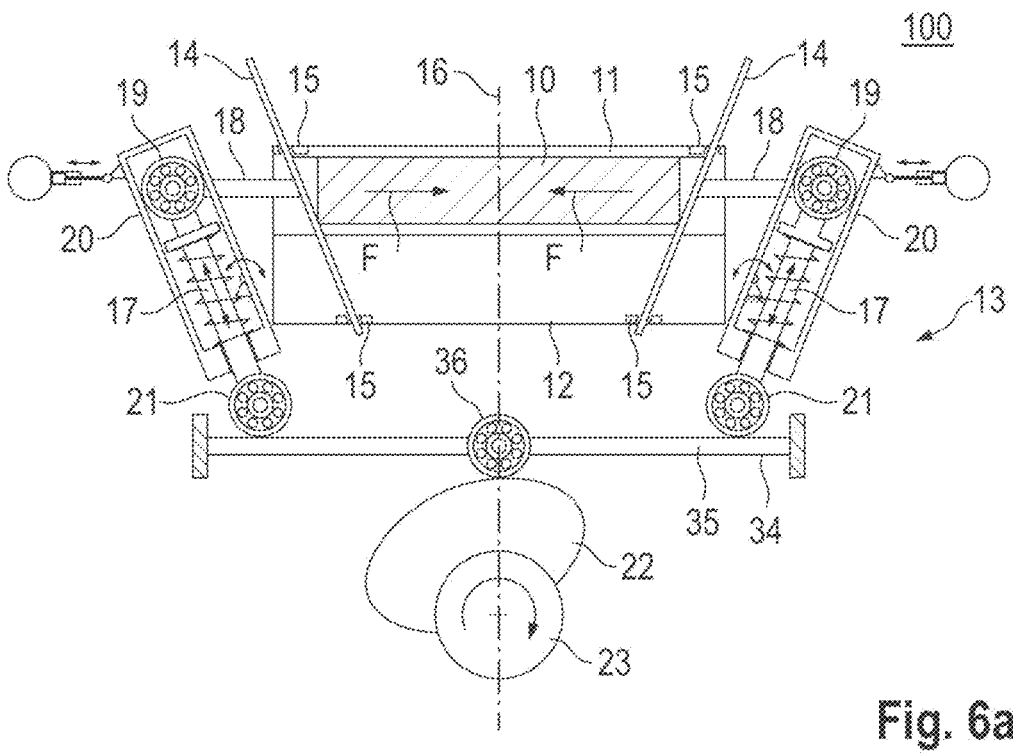
FIG. 6a shows a view of a fourth exemplary embodiment of an elastocaloric heat pump with a force transmission element and a camshaft.
Figure 6B:
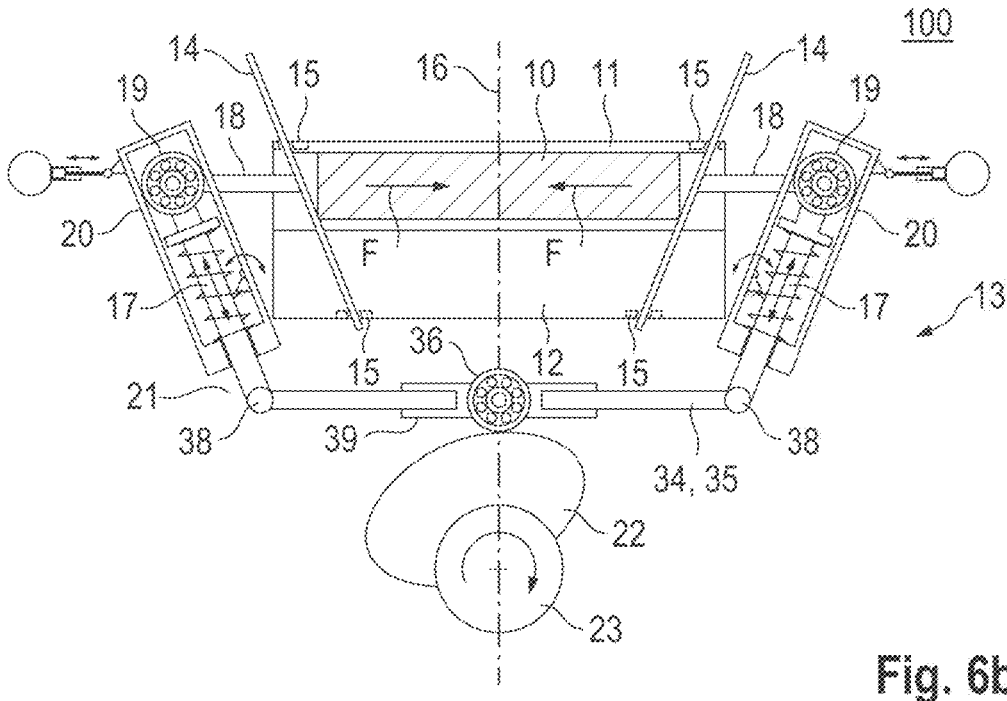
FIG. 6b shows a view of a fifth exemplary embodiment of an elastocaloric heat pump with a force transmission element and a camshaft.
Figure 7A:
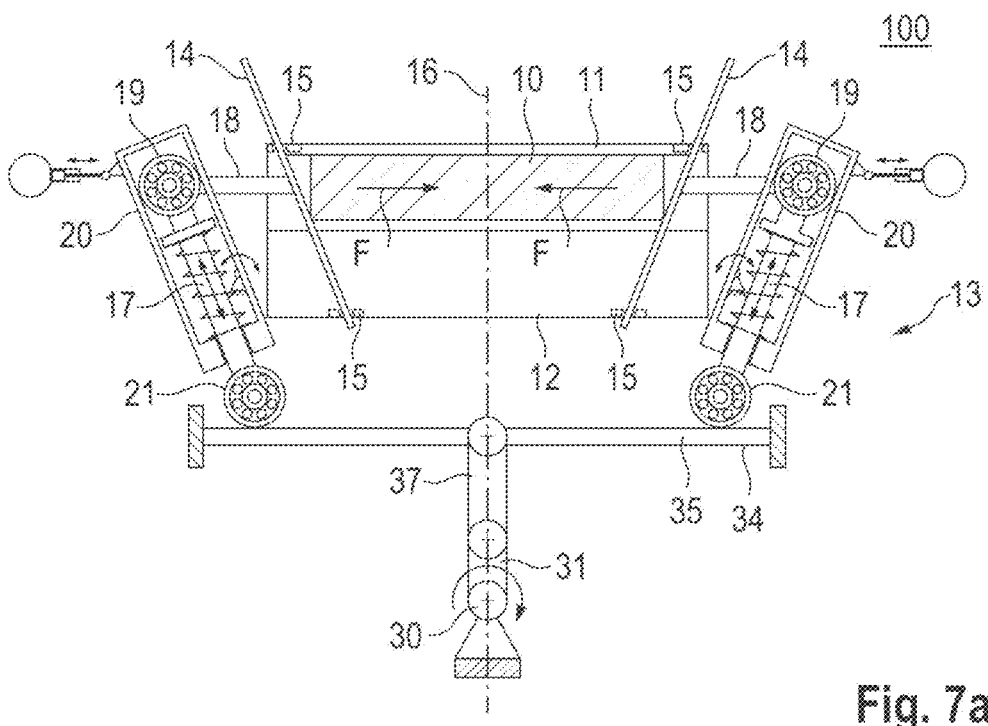
FIG. 7a shows a view of a sixth exemplary embodiment of an elastocaloric heat pump with a force transmission element and a crankshaft.
Figure 7B:
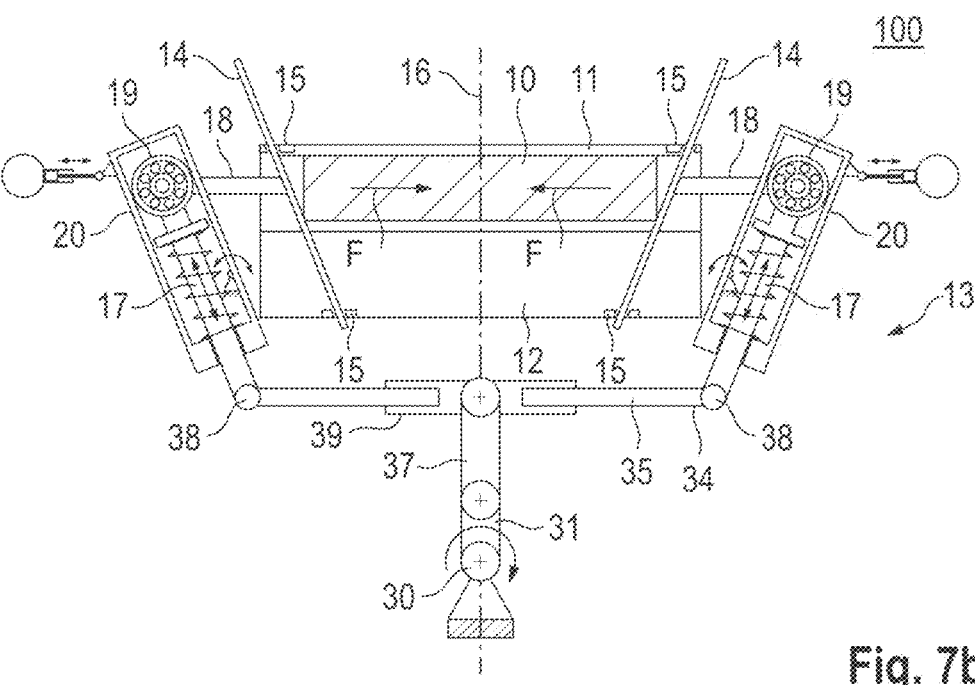
FIG. 7b shows a view of a seventh exemplary embodiment of an elastocaloric heat pump with a force transmission element and a crankshaft.

FIGS. 6a, 6b, 7a and 7b show further exemplary embodiments of an elastocaloric heat pump 100, which comprise just one camshaft 23 (FIGS. 6a and 6b) or just one crankshaft 30 (FIGS. 7a and 7b). The elastocaloric heat pumps 100 have a force transmission element 35 which is designed as a plate 34 and is displaced upward and downward by the camshaft 23 or the crankshaft 30 in the direction of the central axis 16.

In the disclosed embodiments with a camshaft 23 according to FIGS. 6a and 6b, a roller 36 is provided, which runs on the cam 22 of the camshaft 23. In the disclosed embodiments with a crankshaft 30 according to FIGS. 7a and 7b, the crankshaft 30 is connected to the force transmission element 35 via an intermediate connecting rod 37.

The transmission of the up and down movement of the force transmission element 35 to the drive rods 17 can take place in two ways. According to FIGS. 6a and 7a, rollers 21 provided at the end of the drive rods 17 opposite the connection to the rods 18 run on the force transmission element 35. In the disclosed embodiments according to FIGS. 6b and 7b, the drive rods are connected on the end sides to the force transmission element 35 via joints 38, with the force transmission element 35 in these cases being designed to be changeable in length by a telescopic arrangement 39 to avoid tension.

Figure 8:
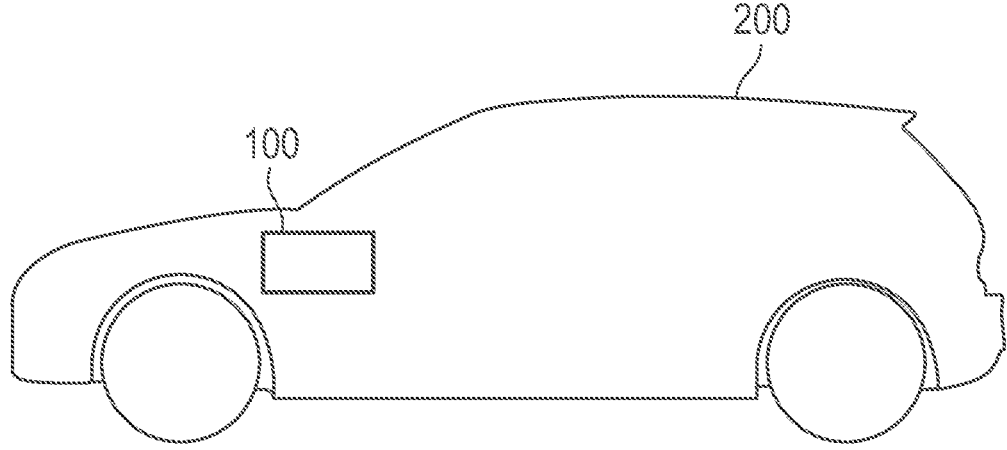
FIG. 8 shows a transportation vehicle with an elastocaloric heat pump.

FIG. 8 shows a transportation vehicle 200 having an elastocaloric heat pump 100, which can be designed according to one of the previously-described embodiments.

Figure 9:
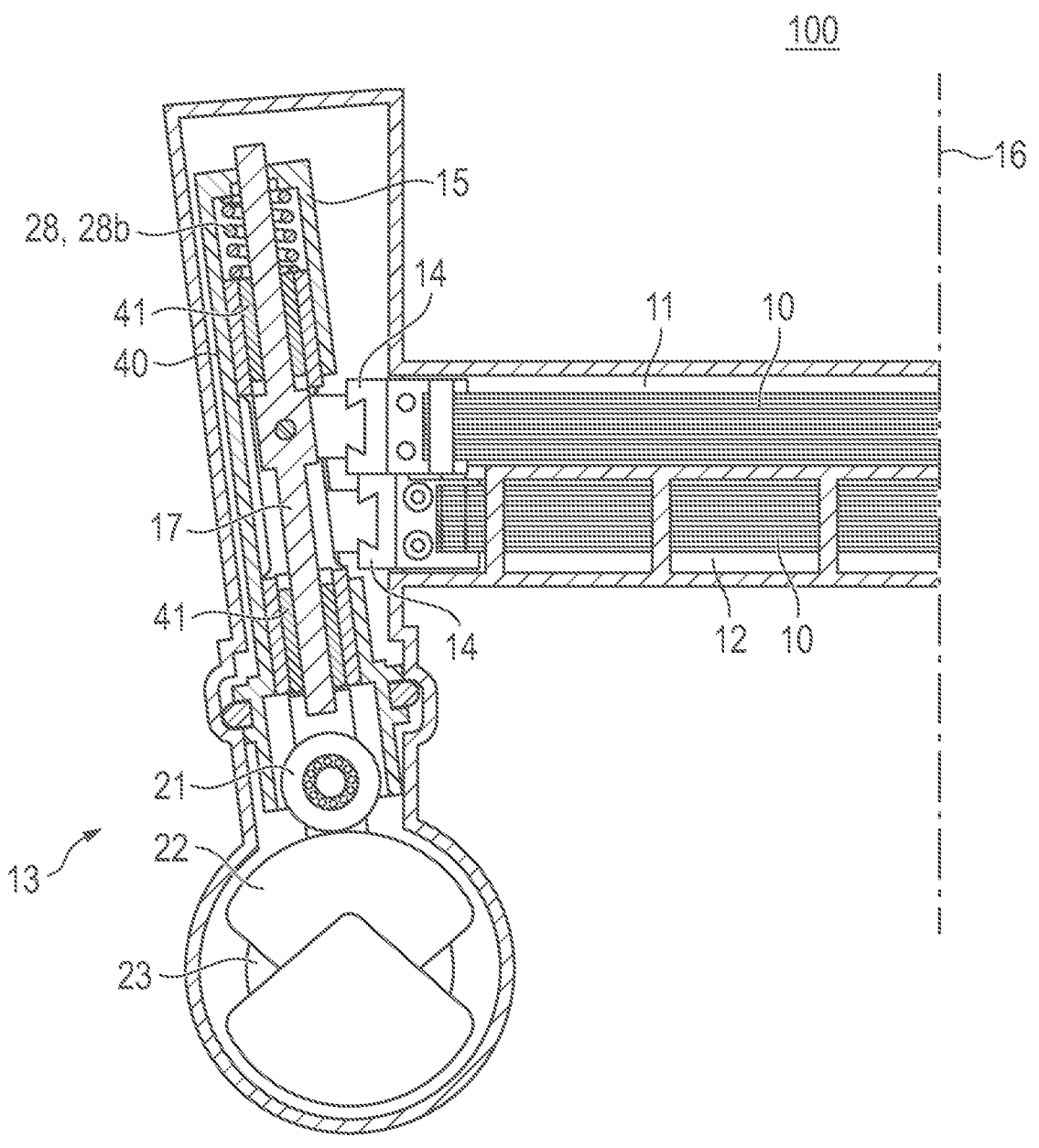
FIG. 9 shows part of another exemplary embodiment of a heat pump.

FIG. 9 shows part of another exemplary embodiment of a heat pump 100. The elastocaloric heat pump 100 can be conceived of being continued in a mirror-inverted state with respect to the central axis 16. The elastocaloric heat pump 100 comprises one, or as shown, two elastocaloric elements 10, a first coolant duct 11, a second coolant duct 12 and a drive device 13. The elastocaloric elements 10 are connected on the end sides to one carriage 14 each, the carriages in turn being arranged displaceably on one of the guide mechanism 15. The guide mechanism 15 are simultaneously a track 40 with a linear guide for the drive rod 17. The linear guide is formed by linear ball bearings 41, within which the drive rod 17 is guided. A spring element 28 designed as a compression spring element 28b is provided to press the drive rod 17 with the roller 21 onto the cam 22 of the camshaft 23.

LIST OF REFERENCE SIGNS

100 Elastocaloric heat pump
200 Transportation vehicle
10 Elastocaloric element
11 First coolant duct
12 Second coolant duct
13 Drive device
14 Carriage
15 Guide mechanism
16 Central axis
17 Drive rod
18 Rod
19 Roller
20 Roller track with linear guide
21 Roller
22 Cam
23 Camshaft
24 Swivel joint
25 Servomotor
26 Clamping jaw
27 Receiving method or mechanism
28 Spring element
28a Tension spring element
28b Compression spring element
29 Square wave signal
30 Crankshaft
31 Crank mechanism
32 Roller track without linear guide
33 Interconnected connecting rod
34 Plate

35 Force transmission element
36 Roller
37 Intermediate connecting rod
38 Joint
39 Telescopic arrangement
40 Track with linear guide
41 Linear ball bearing

The invention claimed is:

1. An elastocaloric heat pump comprising:

a first coolant duct;

a second coolant duct;

an elastocaloric element connected on each end side to a respective carriage, wherein the carriages are arranged displaceably on two guide mechanisms, which are not parallel to each other; and at least one drive device that cyclically displaces the two guide mechanisms that correspond to the carriages so the elastocaloric element is displaced cyclically and cyclically expanded between the first coolant duct and the second coolant duct.

2. The elastocaloric heat pump of claim 1, wherein the at least one drive device comprises drive rods, wherein the carriages are rotatably or rigidly connected to one of the at least one drive rods, and the at least one drive rods are guided along a track.

3. The elastocaloric heat pump of claim 2, wherein tracks are arranged non-orthogonally relative to the plurality of guide mechanisms, and/or wherein the tracks are mounted rotatably so an angle between the respective track and the corresponding respective guide mechanism is adjustable, and/or wherein the tracks are roller tracks, and wherein the drive rods are guided on the respective roller track by rollers.

4. The elastocaloric heat pump of claim 1, further comprising receiving mechanisms arranged on the end sides of the elastocaloric element, wherein each of the receiving mechanisms are each connected rotatably or rigidly to one carriage, and the elastocaloric element is preloaded in tension or in compression between the receiving mechanisms.

5. The elastocaloric heat pump of claim 4, further comprising spring elements configured to at least partially compensate for a force exerted on the carriages along the guide mechanism because of the preloading of the elastocaloric element.

6. The elastocaloric heat pump of claim 1, wherein the drive device comprises a plurality of camshafts, each of the camshafts comprising a cam and the drive rods running on the cam of one of the camshafts by one roller each.

7. A transportation vehicle comprising the elastocaloric heat pump of claim 1.

* * * * *